Nov. 7, 1950   H. PORTER   2,528,707
BRAKE SHOE ANCHORING MEANS
Filed April 19, 1947
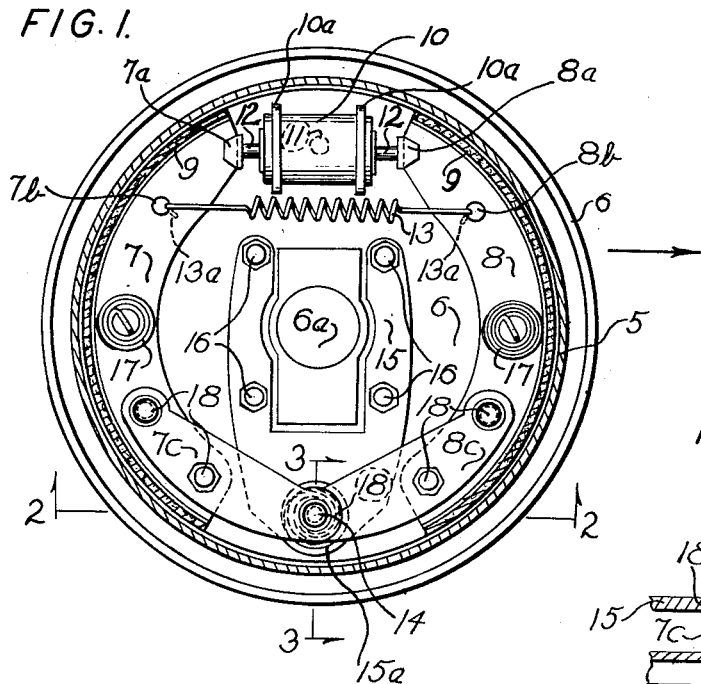
Inventor:
Homer Porter,
By A. L. Fisher,
Attorney.

UNITED STATES PATENT OFFICE 2,528,707

BRAKE SHOE ANCHORING MEANS

Homer Porter, National City, Calif.

Application April 19, 1947, Serial No. 742,561

4 Claims. (Cl. 188—78)

This invention relates to conventional hydraulic brake systems for motor vehicles using the internal type of brake and including vertically and oppositely positioned brake shoes pivotally mounted at their lower ends to work at their upper ends against the encircling flange of the brake drum. In such brake-unit, as the brake drum rotates and the brake is operated, the forward brake shoe for obvious mechanical reasons, takes on much more of the braking load than does the rear brake shoe. It is the prime purpose of the present invention therefore to provide means for equalizing and distributing the braking pressure, load and effect of the two shoes equally between them, and thus incidentally increasing the total braking contact surfaces of the unit and the consequent braking action and effect thereof.

Another object of the invention is to substitute for the usual fixed mounting of the lower ends of the brake shoes, a floating pivotal mounting, whereby excess pressure as otherwise applied to the forward shoe will be transmitted to the rear shoe, thus increasing the braking contact surfaces of shoes and drum, and the total braking effect of the unit.

With the stated objects in view, together with such other objects and advantages as may appear from the specification, attention is directed to the accompanying drawing as illustrating a preferred embodiment of the invention, and wherein Figure 1 is a vertical, longitudinal section through a conventional, internal hydraulic brake unit as applied upon one wheel of the vehicle and as above referred to, showing however the substitution of the floating pivotal mounting or anchorage of the brake shoes at their lower ends, in lieu of the usual fixed pivotal mounting or anchorage.

Figure 2 is a transverse section on the line 2—2 of Figure 1.

Figure 3 is a transverse section on the line 3—3 of Figure 1.

Figure 4 is a detail view in perspective of the flat and spirally coiled spring which constitutes the floating or movable support for the pivotal mounting of the lower ends of the shoe plates 7c, 8c, and connected brake shoes.

As referred to above, this invention is an improvement upon conventional hydraulic brake units as applied to automotive vehicles. As here shown the invention is mounted upon an internal hydraulic brake wherein the numeral 5 represents a brake drum such as is usually carried by and rotates with a wheel of an automotive vehicle, the same being concentrically mounted upon the inner side of the wheel (not shown), and so as to close up against the fixed cover or back plate 6 which is fixedly mounted upon the aligned end of the axle as passed through the central hole 6a. The conventional, arcuate brake shoes are shown at 7 and 8, these shoes being vertically positioned upon the plate 6, and being bolted at 18 to shoe-plates 7c, 8c, which in turn are pivoted at their lower ends to the bight of a U-shaped anchor plate 15 by means of a pivot bolt 14 passed through the overlapped ends of the shoe-plates and through the bight of the anchor plate. To each shoe is secured a friction lining 9. The assembly here shown is one wherein the shoes are pressed outward into contact with the inner annular surfaces of the flange of the drum by hydraulic means, including a pressure or brake cylinder 10, which is secured to the back plate 6 in any conventional manner. Within this cylinder are pistons (not shown) and which are arranged to move asunder by some hydraulic medium forced in between them through a medial opening 11 in the cylinder, by usual means such as a master cylinder and conduit system (not shown). In the usual manner push-rods 12 are extended slidably out through the end caps 10a of the cylinder 10, and their outer ends are positioned freely in the vertically enlarged sockets 7a, 8a, formed in the upper ends of the brake shoes 7, 8, whereby these ends of the rods 12 may play freely in a vertical direction. A shoe retracting spring 13 is positioned between the upper ends of the brake shoes 7 and 8, below the cylinder 10, and the ends of this spring are turned and formed as hooks 13a which are passed through apertures 7b, 8b, formed in the webs of the brake-shoes 7, 8. This spring thus functions for normally holding the shoes to their retracted positions against the stops 17 when the brake is idle. The brake as described is conventionally operated by means of a brake pedal (not shown) mounted in the vehicle for the use of the driver. When the brake pedal is depressed the hydraulic fluid is forced under under pressure from the master cylinder through the several pipe and hose lines to the wheel brake cylinders, whereby the push-rods 12 are forced outwardly and the shoes 7 and 8 are forced into braking contact with the inturned annular flange of the brake drum 5, thus braking the vehicle.

However, in the operation of such brake, it is found in practice that the forward brake shoes, as for example the shoe 8, as the vehicle moves in the direction indicated by the arrow in Figure 1, takes on or is subjected to an unequal proportion of the braking load, this being accounted for by the fact that the rotation of the brake drum 5 over the upper ends of the shoes 7 and 8, pushes downward over the free upper end of the forward shoe 8, thereby tending to press that shoe outward and downward against the flange of the drum with much greater braking action than in the case of the rear shoe 7, where the flange of the drum merely drags freely upward over the shoe.

It is the purpose of the present invention therefore to provide means for equalizing and distributing the braking pressure, action and effect of the forward and rear brake shoes equally between them, by substituting for the conventional and fixed pivotal mounting or anchorage of the lower ends of the shoes, a floating pivotal mounting or anchorage, whereby the stated excess downward and outward push of the forward shoe is transmitted to the rearward shoe as the brake drum of the wheel moves upwardly over it, thus increasing the braking surface and efficiency of the rear brake shoe as applied to the flange of the brake drum.

In the practice of the invention as above described the circular pivot aperture 15a for the bolt 14, at the lower bight portion of the U-shaped anchor plate 15, is diametrically enlarged so as to provide an annular space around the pivot bolt 14 as conventionally employed and passed snugly but freely through the lower ends of the shoe plates 7c, 8c, as above explained, but of course loosely through the pivot aperture 15a. A flat and spirally coiled pivot bolt supporting spring 18 is mounted within the said annular space formed outwardly around the pivot bolt 14 as passed through the enlarged pivot aperture 15a formed through the bight of the anchor plate 15, as aforesaid. This spring thus forms and provides a resilient and yielding mounting cushion or anchorage for the pivot bolt 14, and permits this bolt to shift back and forth within the aperture 15a, under the pressure of the brake shoes 7, 8. Thus it is obvious that the above referred to excess downward push and pressure as imposed upon the forward brake shoe 8 by the rotating brake drum 5, will be transmitted to the rear brake shoe 7 through the shifting of the pivot bolt 14 rearwardly under pressure, thus equalizing the pressure of both shoes upon the flange of the brake drum, in the manner above described, and increasing the braking action of the unit.

In theory, the assemblage thus described, presents approximately the following detailed regimen in operation:

Assuming the drum 5 to be rotating in clockwise direction in Fig. 1, the application of the brake places shoe 8 as the leading shoe with shoe 7 as trailing. Since the assemblage has the toe zones of both shoes separated by the cylinder 10, and the heel zones of composite formation, the heel zones of both shoes are connected together through bolt 14.

As indicated in Figs. 2 and 3, the heel zone of each of the shoes carries two of the extensions, one on each side, the result being that, in effect, the heel zones of each shoe are practically bifurcated with the width of the space between the walls differing in the two shoes. For instance, the space width between extensions 7c is shown as greater than that between extensions 8c. As a result, the anchor plate 15 may be located approximately in the mid-length zone of pivot bolt 14 with the extensions arranged toward the ends of the bolt. Since each of the extensions of a shoe is of similar dimension and located in the end zones of the bolt, the latter is prevented from canting, even though the anchor plate is of comparatively narrow width and located in the mid-length zone of the bolt. Canting of the bolt is prevented through the fact that the extensions from the shoes present the same relationship on each side of such mid-length zone, so that any pressure on the bolt which is provided by a shoe will be applied on opposite sides of such mid-length zone and at similar distances from such zone. In other words, the extensions 7c both lie outside of extensions 8c with the anchor plate 15 located between extensions 8c. Hence, the pressure of a shoe on the pin is applied at two points symmetrically disposed to the mid-length zone with the resistance of spring 18 active within such zone between the points of pressure application, thus providing a balanced distribution active to prevent canting of the pivot bolt, although the mounting of the latter is of a floatable characteristic.

Since bolt 14 is not anchored to the back plate 6, and extends through opening 15a of anchor plate 15 (the latter being secured to the back plate 6), the enlarged opening 15a permits bolt 14 to float, but with the floating action subject to the action of the spring 18 shown in Fig. 3, the exterior of the spring fitting the wall of opening 15a, but, due to the spaced convolutions of the spring, the spring will permit yield under pressure with the yield value dependent upon the resistance of the spring.

When, therefore, the toe ends of the shoes are moved outward into contact with the drum, the toe end of shoe 8 will develop the usual action with respect to the leading shoe through the friction development which tends to move the shoe downwardly; this tendency extending through the length of the shoe and its extensions, but subject to the conditions in the heel zone. At the same time, the toe end of shoe 7 will also be moved into engagement with the rotating drum, but inasmuch as such toe is on the opposite side of the drum, any tendency of the drum to advance shoe 7 due to the friction would be exerted to move such shoe upwardly. Such tendency, however, is small due to the fact that the friction development is in the trailing end of the shoe, and of less value than is being developed in connection with the toe of shoe 8.

Spring 18 is of the convolute type with the convolutions spaced apart, and has its inner end zone adapted to embrace a major portion of the circumferential length of the mid-length zone of bolt 14 while the outer convolution conforms somewhat to the periphery of the opening 15a. It will be understood that when pressure is applied to the pivot bolt through the extensions of one of the shoes, the tendency will be to cause the bolt to be moved in the direction of pressure application, thus shifting the position of the bolt axis in such direction the bolt movement inherently applying pressure on the spring 18 in similar direction. Since the spring cannot move bodily due to the wall of opening 15a, the pressure will tend to place the spring under tension, thus setting up a resistance factor opposing the pressure and causing the net pressure value active in the bolt displacement to be equal to the difference between the opposing pressures.

But the direction of displacement of the bolt under such pressure is also subject to the conditions provided by the connection of the pairs of extensions with the bolt 14, these connections being limited to a pivotal movement of the extensions on the bolt. Hence, if downward pressure is being applied on shoe 8, bolt displacement would not be directly downward, but would be varied therefrom due to the fact that the shoe 7 is not providing downward pressure, but its heel portion must move with the bolt with such heel portion subject to the conditions at the toe end of shoe 7. As a result, the direction of displacement of the bolt becomes varied from the direction of pressure application, the variations depending upon the direction of pressure application, and the net values of the pressure itself.

The underlying feature in this respect, however, is the fact that regardless of the direction of bolt displacement, the latter is made subject to the resistance of the spring 18 and the effect of the displacement on the trailing shoe, these providing a controlling effect on the direction and extent of the bolt displacement in presence of braking pressure being applied on the leading shoe. Spring 18 retains the bolt in its normal axial position in the absence of braking pressure, and the displacement of the bolt necessarily moves the bolt axis outwardly from such normal position regardless of the direction of pressure application. It is probable that the direction of displacement may vary while developing the reactions which follow the contact of the toe of the leading shoe with the drum, as the various factors come into activity. These are permitted by the floatable characteristic of the bolt, but at all times the movement of the bolt in a direction of displacement is subject to the resistance of spring 18. The direction of displacement is not limited in any manner, but is always outward relative to the axis of opening 15a, the developing of the direction being dependent upon the reactions produced on and by the shoes as the reactions develop.

From this it is possible to assume that when pressure is applied to the toe end of leading shoe 8, the resultant downward trend would bring the resistance of spring 18 into activity and tend to move the lower end of the shoe outward, thus increasing the surface contact. At the same time the displacement of bolt 14 would tend to move the lower end of shoe 7 outwardly, through the direct connection of both shoes with the bolt, and thus increase the surface contact of shoe 7. And since spring 18 does not overpower the pressure applied to either shoe, the phenomena of toe lag of the leading shoe is not present, since the ability of the bolt to float prevents the development of the conditions of such lag.

It is thought that from the foregoing description and explanation, the construction, use and operation of the invention will be fully understood, and while I have herein shown and described a specific embodiment of the invention and specific structural features thereof, it is understood that said structural features may be changed or modified in minor details, within the scope of the claims.

I claim:

1. In a brake assemblage of the kind described, a flanged drum rotatable with the wheel on which it is mounted, a pair of oppositely disposed and vertically mounted brake shoes movable into and out of engagement with the flange of the drum for braking purposes, shoe plates rigidly attached to said shoes for mounting purposes, a pivot bolt passed through the shoe plates of the shoes to accommodate the shoe movements resulting from power applications upon the upwardly positioned toes of the brake shoes, an anchor plate with which said pivot bolt is operatively connected by means of a hole through the bight of the plate through which the pivot bolt is passed, the said pivot bolt hole of the anchor plate being of materially greater dimensions diametrically than the corresponding dimensions of the pivot bolt, to provide an annular space between the bolt and the margins of the said bolt hole of the anchor plate through which the bolt is passed, and resilient means interposed around the inner margins of the bolthole and the bolt as passed therethrough, said resilient means being operative to permit limited movements of the bolt within the bolt hole, in the operation of the brake mechanism and shoes.

2. An assemblage according to claim 1, characterized in that the resilient means referred to comprises a convolute spring having the convolutions thereof standing in spaced relation, the inner convolution embracing a substantial portion of the length of the pivot bolt circumference, and with the outer convolution contacting the peripheral wall of the bolt hole of the said anchor plate, said spring normally holding the axis of the bolt in alignment with the axis of the said bolt hole through which the bolt is passed, and thus permitting bodily movement of the bolt subject to spring resistance, under the operation of the brake mechanisms.

3. An assemblage according to claim 2, characterized in that the width of the spring convolution is approximately equal to the width of the bolt hole opening through the plate, and with the convolutions located between a pair of planes extending normal to the direction of length of the bolt and plate axes.

4. In a brake mechanism of the kind described and wherein is included a flanged brake drum and an anchor plate fixedly mounted upon the inner side of a wheel, and including a pair of oppositely disposed and vertically mounted brake shoes movable into and out of engagement with the flange of the drum for braking purposes, shoe plates rigidly attached to said shoes for mounting purposes, a pivot bolt passed through the shoe plates of the shoes to accommodate the shoe movements, the bolt hole of the anchor plate being enlarged relative to the diameter of the bolt as passed therethrough for providing a circumferential space between the bolt and the margins of the bolt hole, a flat coil spring mounted within said circumferential space for providing a resilient seating for the said pivot bolt, whereby excess brake pressure imposed upon one of the said brake shoes is transmitted to the companion brake shoe through the shifting movement of the said pivot bolt under pressure within its said resilient seating within the said bolt hole of the anchor plate.

HOMER PORTER.

REFERENCES CITED

The following references are of record in the file of this patent:

UNITED STATES PATENTS

| Number | Name | Date |
| --- | --- | --- |
| 1,727,717 | Kelley | Sept 10, 1929 |
| 2,068,959 | McConkey | Jan. 26, 1937 |
| 2,102,851 | La Brie | Dec. 21, 1937 |
| 2,208,293 | Hayes et al. | July 16, 1940 |
| 2,251,854 | Parnell et al. | Aug. 5, 1941 |
| 2,277,577 | Boldt | Mar. 24, 1942 |